A. G. STRAWBRIDGE & W. M. STEVENSON.
HORSES' FOOT-WEIGHT.

No. 174,025. Patented Feb. 22, 1876.

WITNESSES:
Jas. V. Hutchinson
D. G. Stuart

INVENTOR.
Alfred G. Strawbridge
William M. Stevenson
By A. McCallum
Atty

UNITED STATES PATENT OFFICE.

ALFRED G. STRAWBRIDGE AND WILLIAM M. STEVENSON, OF SHARON, PA.

IMPROVEMENT IN HORSES' FOOT-WEIGHTS.

Specification forming part of Letters Patent No. 174,025, dated February 22, 1876; application filed September 13, 1875.

*To all whom it may concern:*

Be it known that we, ALFRED G. STRAWBRIDGE and WILLIAM M. STEVENSON, of Sharon, in the county of Mercer and State of Pennsylvania, have invented certain new and useful Improvements in Horses' Foot-Weights; and we do hereby declare that the following is a full, clear, and exact description thereof, which will enable others skilled in the art to which it pertains to make and use the same, reference being had to the accompanying drawing, and to the letters of reference marked thereon, which form a part of this specification.

Our invention relates to a new and improved weight for attachment to the feet of horses, for the purpose of improving their gait, and making them better suited for track and road purposes. This improved toe-weight we call the "Challenge Composition Toe-Weight."

Our invention consists in making the toe-weight so that it can be readily secured to the foot by screwing it on to the shoe, the screw passing directly into the shoe, or through only a small portion of the lower front part of the hoof, where it is hard and insensitive, before passing into the shoe. Lugs or spurs on the weight pass into slots formed in said hard portion of the hoof at a point between it and the shoe, and so as to bear against the latter, thereby obviating all pressure or strain on the horse's hoof, and avoiding all danger of contraction by the pressure of ligatures or straps on the upper and more sensitive portions of the hoof, as is now the case with such toe-weights as have heretofore been used. It also consists in combining with said toe-weight a pad of rubber or other elastic material suitable for the purpose, which is interposed between the inner side of the weight and the horse's hoof, the rubber conforming to any irregularities in the hoof, and distributing the weight equally upon the foot, thereby insuring a perfect fit for any horse without having to alter the metal portion of the weight. The rubber also protects the hoof from contact with and injury to the hoof by concussion with the hard surface of the weight, and avoids all the clatter or noise which the ordinary toe-weights now in use make. It further consists n the means for securing the rubber pad in its position in the toe-weight, as hereinafter more fully set forth.

Figure 1:
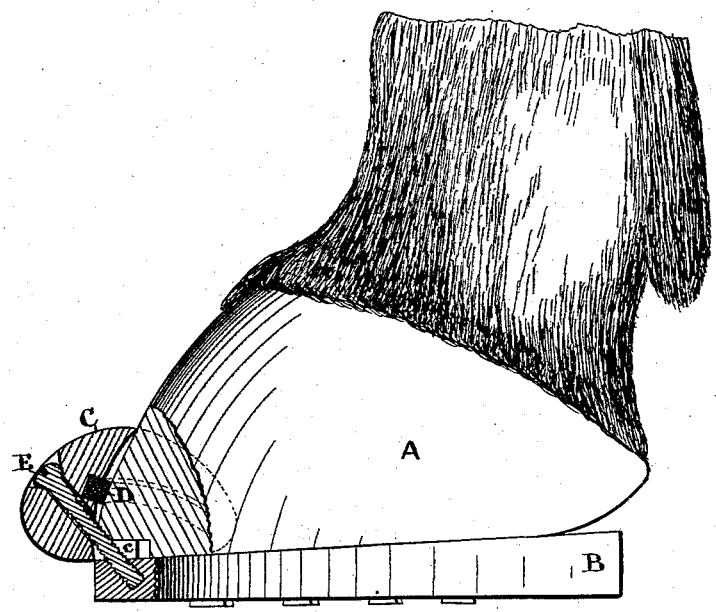
Figure 2:
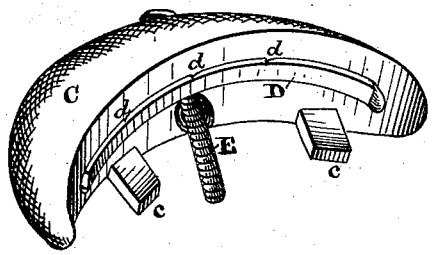

In the accompanying drawings, Figure 1 represents a horse's foot with our improved toe-weight secured thereto, a portion of the hoof, weight, and the horseshoe being in section for the purpose of showing the method of attachment. Fig. 2 is a perspective view of our toe-weight detached from the horse's foot.

Referring to the parts by letters, A represents the horse's foot partially cut away at the toe. B is the shoe, secured to the horse's foot in the usual manner. C is our improved toe-weight, made of brass, or any other suitable composition or material of sufficient weight. It is shaped so as to conform generally to the contour of a horse's foot, its inner side being intended to fit the toe and have the appearance of forming a part of the hoof. *c c* are two lugs or spurs which are formed on the inside of the weight, and project from its lower edge, so as to fit into grooves or slots made in the hard part of the horse's toe for their reception, as clearly shown in Fig. 1 of the drawings.

It will be seen that these lugs or projections rest upon and bear against the upper side of the horseshoe, and cannot injure the foot, the groove being cut into the hardest and most callous part of the hoof.

D is a pad of rubber or other suitable elastic material, which fits into and is secured in a groove formed on the inner side of the toe-weight for its reception. It is held in place by a very simply device—to wit, by the hook or saw-tooth like projections *d*, formed in the metal around the outer edges of the groove.

The rubber or elastic pad D may be of any convenient or desirable shape, so long as a portion of it projects beyond the groove in which it is placed.

E is a screw, which passes through a diagonal slot, *e*, formed in the toe-weight, the slot being at its outer end a little larger than the screw-head, so that the latter may be countersunk therein, and be readily adjusted. The head of the screw we prefer to be solid, and square or rectangular in shape, like a nut, so that it can be conveniently operated by a suitable key or wrench. The lower end of the screw is threaded, and the horseshoe is correspondingly tapped, so that when the toe-weight is placed in position, with the spurs or lugs $c\ c$ between the shoe and the hoof, and the screw E driven home, the threaded portion will pass through the corner of the horse's toe into the shoe, or directly into the shoe without passing through any portion of the hoof, and be thereby securely held thereto without any other fastening device.

The rubber pad, being at the same time pressed against the front of the hoof, will fill up any irregularities or inequalities in the contour of the hoof, thereby insuring a perfect fit, and, from its elastic nature, it does not interfere in any way with the natural growth of the hoof, and cannot thereby injure or contract the horse's foot. It will also be seen that by this method of fastening the weight all the strain is brought upon the shoe and hard, callous portion of the hoof, so that no injurious pressure is brought upon the more tender and sensitive portion of the hoof.

Having thus fully described our invention, what we claim as new, and desire to secure by Letters Patent, is—

1. A toe-weight for horse's feet, constructed substantially as described, and secured to the horseshoe by a screw or bolt, thereby dispensing with the use of straps, as and for the purpose set forth.

2. The combination of the toe-weight C and elastic pad D, substantially as and for the purpose specified.

3. The elastic pad D, secured to the slotted toe-weight C by means of the saw-tooth edges $d$, substantially as specified.

4. The toe-piece C, having lugs $c$, screw E, and elastic pad D, all operating in combination, substantially as and for the purpose specified.

In testimony that we claim the foregoing as our own we affix our signatures in presence of two witnesses.

ALFRED G. STRAWBRIDGE.
WM. M. STEVENSON.

Witnesses:
   JOHN A. PORTER,
   JAS. W. GIBSON.